United States Patent
Patchava et al.

(10) Patent No.: US 12,483,297 B2
(45) Date of Patent: Nov. 25, 2025

(54) CYCLIC DELAY AND DOPPLER SHIFT

(71) Applicant: QUALCOMM Incorporated, San Diego, CA (US)

(72) Inventors: Raviteja Patchava, San Diego, CA (US); Xiaoxia Zhang, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 18/065,953

(22) Filed: Dec. 14, 2022

(65) Prior Publication Data

US 2024/0204824 A1    Jun. 20, 2024

(51) Int. Cl.
| | | |
|---|---|---|
| H04B 7/024 | (2017.01) | |
| H04B 7/01 | (2006.01) | |
| H04B 7/06 | (2006.01) | |
| H04W 72/044 | (2023.01) | |
| H04W 72/232 | (2023.01) | |

(52) U.S. Cl.
CPC ............ *H04B 7/024* (2013.01); *H04B 7/01* (2013.01); *H04B 7/0671* (2013.01); *H04W 72/044* (2013.01); *H04W 72/232* (2023.01)

(58) Field of Classification Search
CPC ........ H04B 7/01; H04B 7/0671; H04B 7/024; H04W 72/044; H04W 72/232; H04L 5/0051
See application file for complete search history.

(56) References Cited

U.S. PATENT DOCUMENTS

| | | | |
|---|---|---|---|
| 2019/0238189 A1* | 8/2019 | Delfeld | H04J 11/00 |
| 2022/0029676 A1* | 1/2022 | Ramireddy | H04B 7/10 |
| 2022/0231738 A1* | 7/2022 | Haustein | H04B 7/0673 |
| 2023/0388910 A1* | 11/2023 | Yuan | H04W 72/0453 |
| 2024/0275641 A1* | 8/2024 | Shojaeifard | H04L 5/0085 |
| 2025/0147168 A1* | 5/2025 | Kishigami | G01S 13/343 |
| 2025/0172660 A1* | 5/2025 | Kishigami | G01S 13/424 |
| 2025/0202635 A1* | 6/2025 | Gao | H04L 25/03343 |
| 2025/0226865 A1* | 7/2025 | Ahmed | H04B 7/0639 |

FOREIGN PATENT DOCUMENTS

WO    WO-2023061491 A1 *    4/2023

OTHER PUBLICATIONS

Hao et al, "Information Transmission Method and Apparatus, and Sending End", Apr. 20, 2023, WO, English translation of WO 2023061491 (Year: 2023).*

* cited by examiner

*Primary Examiner* — Michael K Phillips
(74) *Attorney, Agent, or Firm* — Harrity & Harrity LLP

(57) ABSTRACT

Various aspects of the present disclosure generally relate to wireless communication. In some aspects, a transmitter may apply at least one of an amount of delay or an amount of Doppler shift to a signal transmission including a first signal for transmission from a first antenna and a second signal for transmission from a second antenna, wherein the second signal is shifted, relative to the first signal, in a delay-Doppler domain, by the at least one of the amount of delay or the amount of Doppler shift. The transmitter may output, in a time-frequency domain, the first signal from the first antenna and the second signal from a second antenna. Numerous other aspects are described.

23 Claims, 14 Drawing Sheets

CYCLIC DELAY AND DOPPLER SHIFT

FIELD OF THE DISCLOSURE

Aspects of the present disclosure generally relate to wireless communication and to techniques and apparatuses for cyclic delay and Doppler shift.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform (DFT) spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
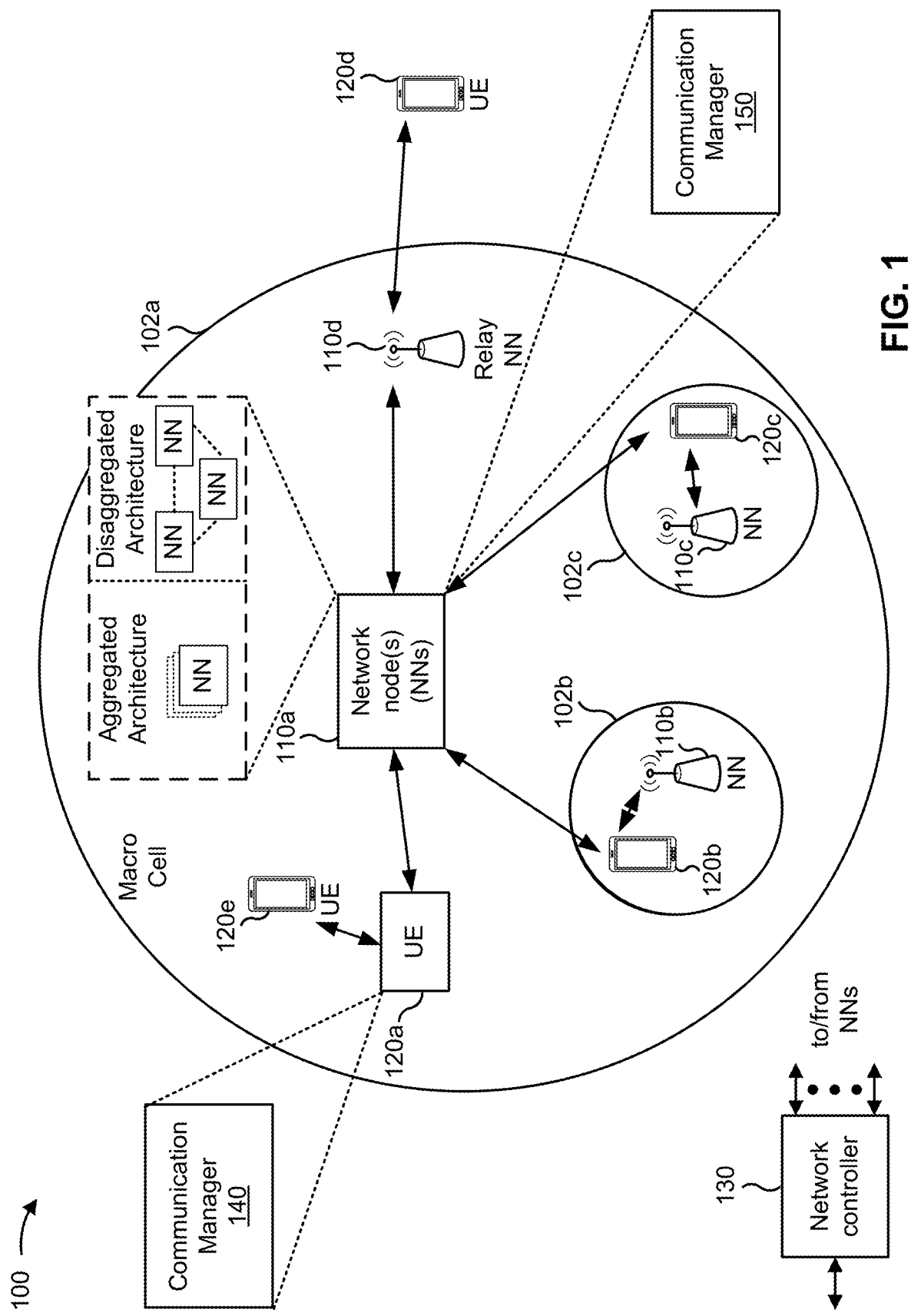
FIG. 1 is a diagram illustrating an example of a wireless network, in accordance with the present disclosure.

Some aspects described herein relate to a method of wireless communication performed by a transmitter. The method may include applying at least one of an amount of delay or an amount of Doppler shift to a signal transmission including a first signal for transmission from a first antenna and a second signal for transmission from a second antenna, wherein the second signal is shifted, relative to the first signal, in a delay-Doppler domain, by the at least one of the amount of delay or the amount of Doppler shift. The method may include outputting, in a time-frequency domain, the first signal from the first antenna and the second signal from a second antenna.

Some aspects described herein relate to a method of wireless communication performed by an apparatus of a user equipment (UE). The method may include receiving an indication of at least one of an amount of delay or an amount of Doppler shift, in a delay-Doppler domain, of a signal transmission. The method may include receiving, in a time-frequency domain, a first signal from a first antenna and a second signal from a second antenna, wherein the second signal is shifted in the delay-Doppler domain, relative to the first signal, by the at least one of the amount of delay or the amount of Doppler shift.

Some aspects described herein relate to a transmitter for wireless communication. The transmitter may include a memory and one or more processors coupled to the memory. The one or more processors may be configured to apply at least one of an amount of delay or an amount of Doppler shift to a signal transmission including a first signal for transmission from a first antenna and a second signal for transmission from a second antenna, wherein the second signal is shifted, relative to the first signal, in a delay-Doppler domain, by the at least one of the amount of delay or the amount of Doppler shift. The one or more processors may be configured to output, in a time-frequency domain, the first signal from the first antenna and the second signal from a second antenna.

Some aspects described herein relate to a UE for wireless communication. The UE may include a memory and one or more processors coupled to the memory. The one or more processors may be configured to receive an indication of at least one of an amount of delay or an amount of Doppler shift, in a delay-Doppler domain, of a signal transmission. The one or more processors may be configured to receive, in a time-frequency domain, a first signal from a first antenna and a second signal from a second antenna, wherein the second signal is shifted in the delay-Doppler domain, relative to the first signal, by the at least one of the amount of delay or the amount of Doppler shift.

Some aspects described herein relate to a non-transitory computer-readable medium that stores a set of instructions for wireless communication by a transmitter. The set of instructions, when executed by one or more processors of the transmitter, may cause the transmitter to apply at least one of an amount of delay or an amount of Doppler shift to a signal transmission including a first signal for transmission from a first antenna and a second signal for transmission from a second antenna, wherein the second signal is shifted, relative to the first signal, in a delay-Doppler domain, by the at least one of the amount of delay or the amount of Doppler shift. The set of instructions, when executed by one or more processors of the transmitter, may cause the transmitter to output, in a time-frequency domain, the first signal from the first antenna and the second signal from a second antenna.

Some aspects described herein relate to a non-transitory computer-readable medium that stores a set of instructions for wireless communication by a UE. The set of instructions, when executed by one or more processors of the UE, may cause the UE to receive an indication of at least one of an amount of delay or an amount of Doppler shift, in a delay-Doppler domain, of a signal transmission. The set of instructions, when executed by one or more processors of the UE, may cause the UE to receive, in a time-frequency domain, a first signal from a first antenna and a second signal from a second antenna, wherein the second signal is shifted in the delay-Doppler domain, relative to the first signal, by the at least one of the amount of delay or the amount of Doppler shift.

Some aspects described herein relate to an apparatus for wireless communication. The apparatus may include means for applying at least one of an amount of delay or an amount of Doppler shift to a signal transmission including a first signal for transmission from a first antenna and a second signal for transmission from a second antenna, wherein the second signal is shifted, relative to the first signal, in a delay-Doppler domain, by the at least one of the amount of delay or the amount of Doppler shift. The apparatus may include means for outputting, in a time-frequency domain, the first signal from the first antenna and the second signal from a second antenna.

Some aspects described herein relate to an apparatus for wireless communication. The apparatus may include means for receiving an indication of at least one of an amount of delay or an amount of Doppler shift, in a delay-Doppler domain, of a signal transmission. The apparatus may include means for receiving, in a time-frequency domain, a first signal from a first antenna and a second signal from a second antenna, wherein the second signal is shifted in the delay-Doppler domain, relative to the first signal, by the at least one of the amount of delay or the amount of Doppler shift.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a transmitter (e.g., network node 110) may include a communication manager 150. As described in more detail elsewhere herein, the communication manager 150 may apply at least one of an amount of delay or an amount of Doppler shift to a signal transmission including a first signal for transmission from a first antenna and a second signal for transmission from a second antenna, wherein the second signal is shifted, relative to the first signal, in a delay-Doppler domain, by the at least one of the amount of delay or the amount of Doppler shift; and output, in a time-frequency domain, the first signal from the first antenna and the second signal from a second antenna. Additionally, or alternatively, the communication manager 150 may perform one or more other operations described herein.

In some aspects, the UE 120 may include a communication manager 140. As described in more detail elsewhere herein, the communication manager 140 may receive an indication of at least one of an amount of delay or an amount of Doppler shift, in a delay-Doppler domain, of a signal transmission; and receive, in a time-frequency domain, a first signal from a first antenna and a second signal from a second antenna, wherein the second signal is shifted in the delay-Doppler domain, relative to the first signal, by the at least one of the amount of delay or the amount of Doppler shift. Additionally, or alternatively, the communication manager 140 may perform one or more other operations described herein.

As indicated above, FIG. 1 is provided as an example. Other examples may differ from what is described with regard to FIG. 1.

Figure 2:
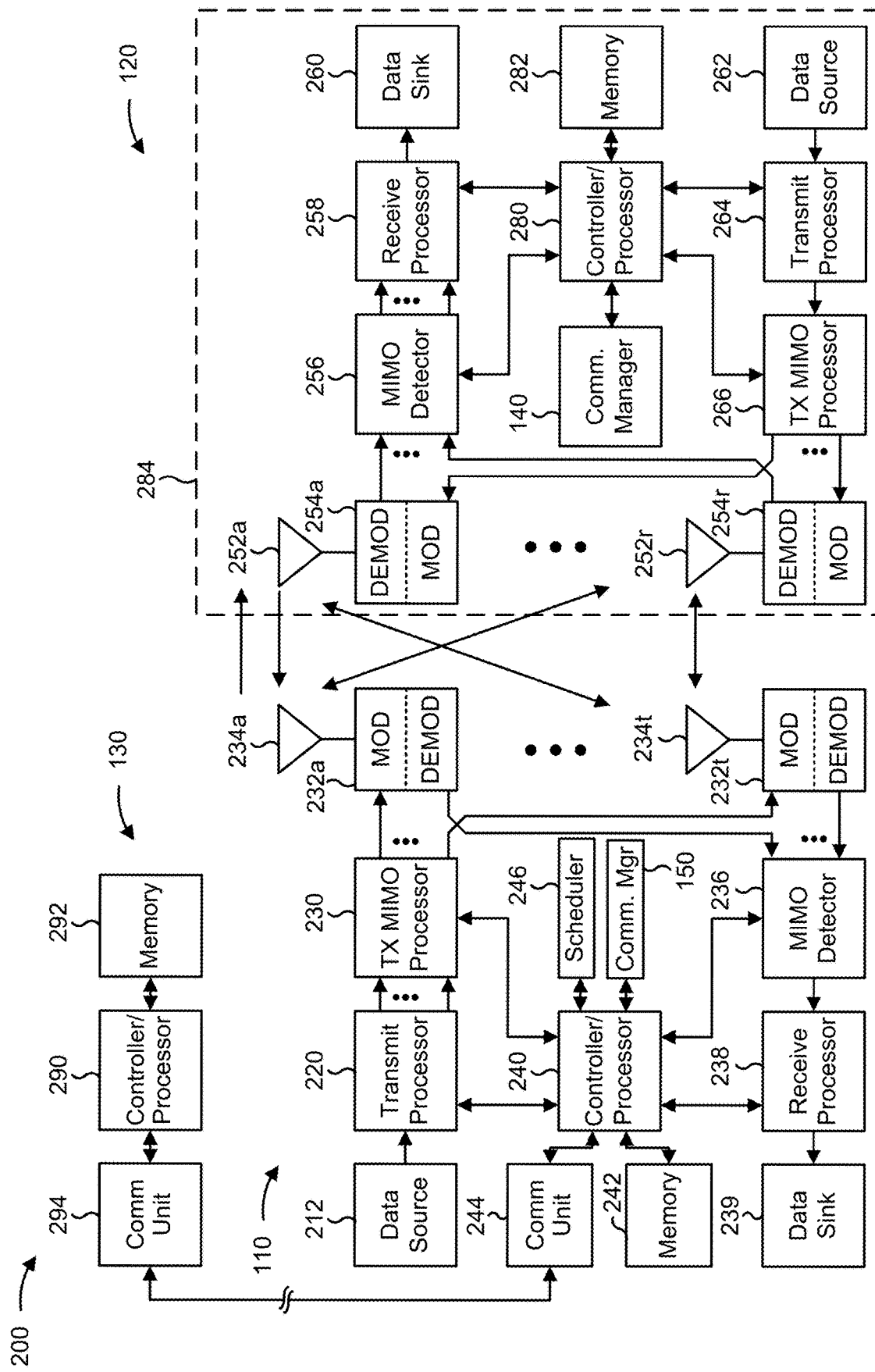
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4A-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4A-13).

The controller/processor 240 of the network node 110, the controller/processor 280 of the UE 120, and/or any other component(s) of FIG. 2 may perform one or more techniques associated with cyclic delay and Doppler shift for, e.g., orthogonal time frequency and space (OTFS) open-loop precoding, as described in more detail elsewhere herein. In some aspects, the transmitter described herein is the network node 110, is included in the network node 110, or includes one or more components of the network node 110 shown in FIG. 2. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 11 of FIG. 11, and/or other processes as described herein. In some examples, executing instructions may include running the instructions, converting the instructions, compiling the instructions, and/or interpreting the instructions, among other examples.

In some aspects, the transmitter (e.g., network node 110) includes means for applying at least one of an amount of delay or an amount of Doppler shift to a signal transmission including a first signal for transmission from a first antenna and a second signal for transmission from a second antenna, wherein the second signal is shifted, relative to the first signal, in a delay-Doppler domain, by the at least one of the amount of delay or the amount of Doppler shift; and/or means for outputting, in a time-frequency domain, the first signal from the first antenna and the second signal from a second antenna. In some aspects, the means for the transmitter to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE 120 includes means for receiving an indication of at least one of an amount of delay or an amount of Doppler shift, in a delay-Doppler domain, of a signal transmission; and/or means for receiving, in a time-frequency domain, a first signal from a first antenna and a second signal from a second antenna, wherein the second signal is shifted in the delay-Doppler domain, relative to the first signal, by the at least one of the amount of delay or the amount of Doppler shift. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
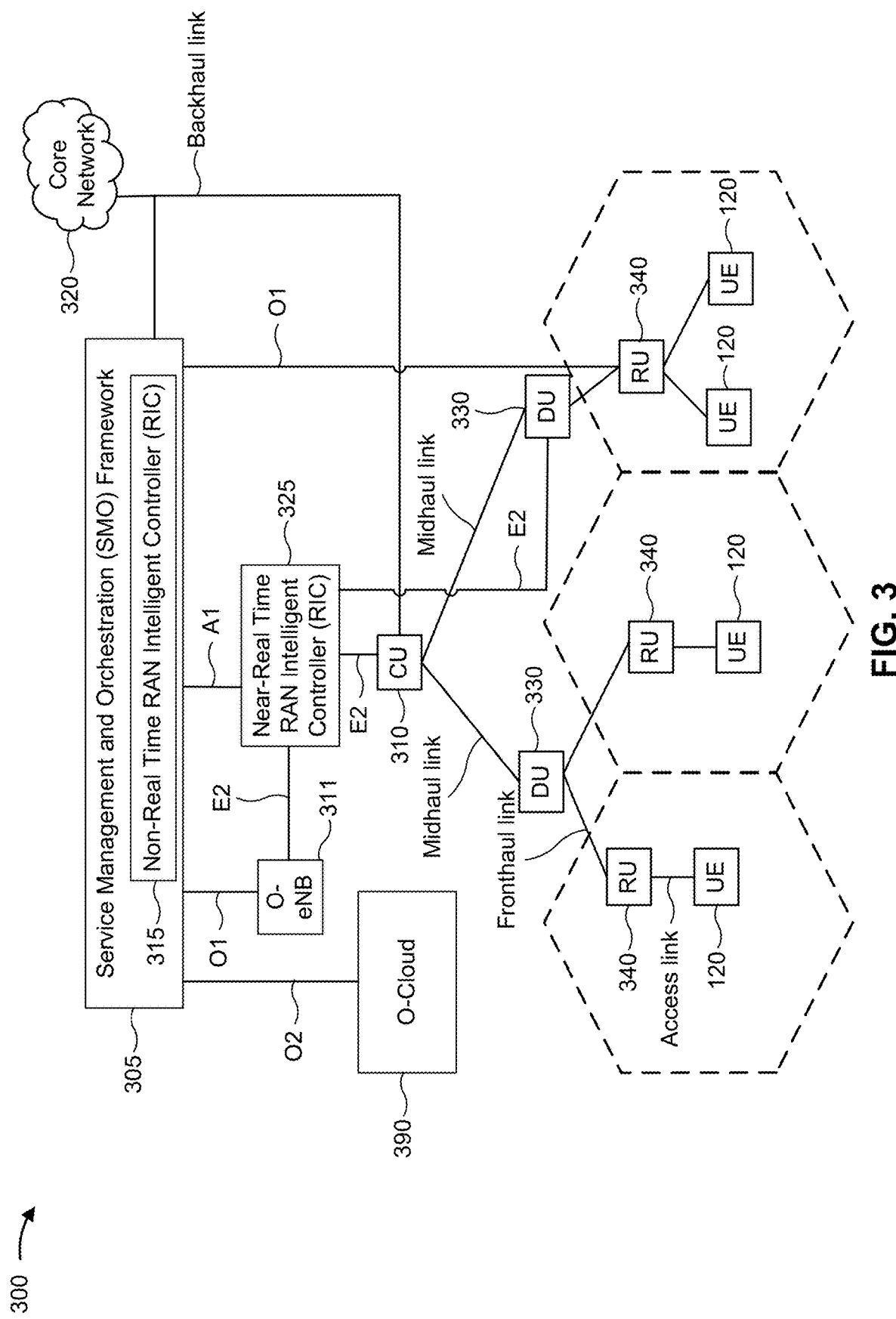
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4A:
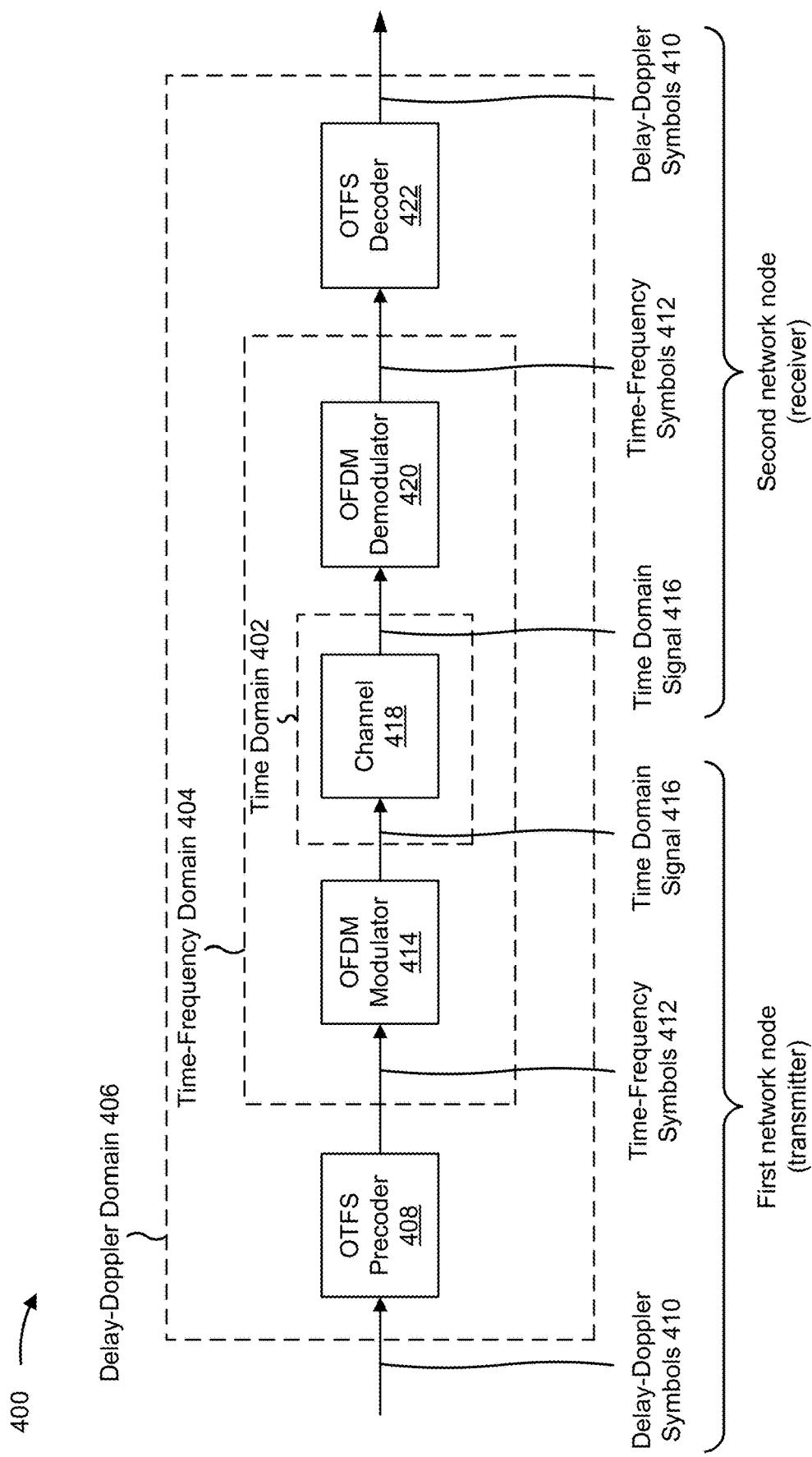
FIGS. 4A-4B are diagrams illustrating examples associated with communication based on an orthogonal time frequency space (OTFS) waveform, in accordance with the present disclosure.
Figure 4B:
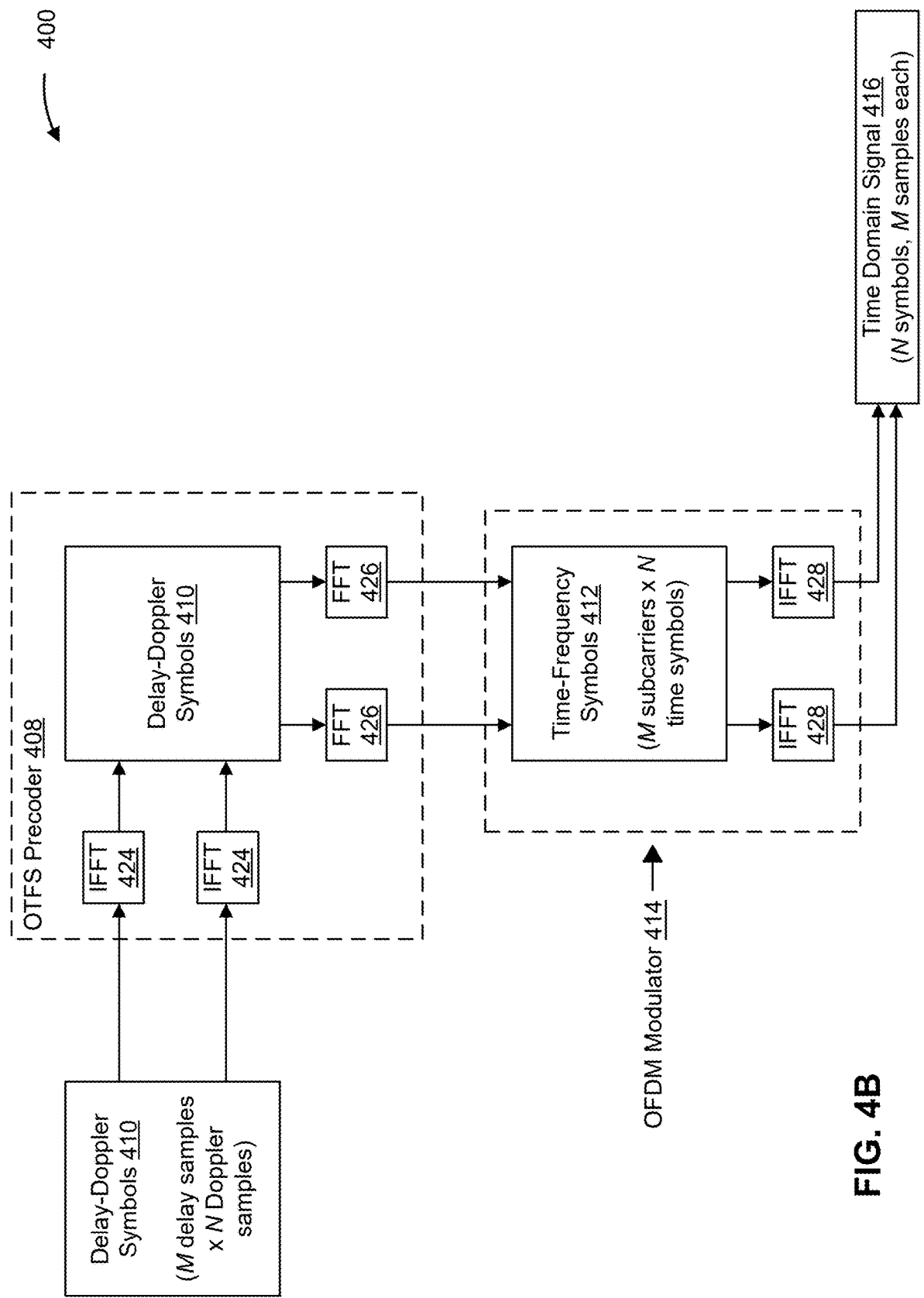

FIGS. 4A-4B are diagrams illustrating examples 400 associated with communication based on an orthogonal time frequency space (OTFS) waveform, in accordance with the present disclosure.

In a wireless network, such as an NR network, wireless communication may be based on orthogonal frequency division multiplexing (OFDM) modulation and demodulation. For example, in OFDM, multiple closely spaced orthogonal subcarrier signals with overlapping spectra are transmitted to carry data in parallel, demodulation is based on FFT algorithms, and a guard interval precedes the beginning of each symbol to improve orthogonality in transmission channels that may be affected by multipath propagation. In OFDM techniques, each subcarrier (or signal) is modulated using a modulation scheme (e.g., quadrature amplitude modulated (QAM) or phase-shift keying) at a low symbol rate, which maintains total data rates at a level similar to single-carrier modulation schemes in the same bandwidth. Accordingly, relative to single-carrier schemes, OFDM techniques may tolerate severe channel conditions (e.g., attenuation of high frequencies, narrowband interference, and/or frequency-selective fading due to multipath) without requiring complex equalization filters. The low symbol rate enables the use of a guard interval between symbols to eliminate inter-symbol interference (ISI) and use echoes and time-spreading to achieve a diversity gain (e.g., a signal-to-noise ratio (SNR) improvement). This mechanism also facilitates a single frequency network (SFN) where several adjacent transmitters send the same signal simultaneously at the same frequency, as the signals from multiple distant transmitters may be constructively recombined at the receiver.

In some cases, however, OFDM modulation and demodulation of wireless communications may be susceptible to high residual frequency offset and/or large Doppler spread. These issues can occur, for example, in high-Doppler environments such as high-speed train (HST) or high-speed rail (HSR) communications, V2X communications, high-speed vehicle communications, and/or other high-mobility communication environments in which channel conditions in a wireless network rapidly change.

As shown in FIG. 4A, communication between the transmitter node and the receiver node may be performed in a time domain 402. A signal to be transmitted by the transmitter node to the receiver node may be converted or transformed to the time domain 402 from one or more other domains, such as a time-frequency domain 404 and a delay-Doppler domain 406. The signal transmitted from the transmitter node to the receiver node may be an uplink communication (e.g., a sounding reference signal (SRS) transmission, a physical uplink control channel (PUCCH) communication, or a physical uplink shared channel (PUSCH) communication), a downlink communication (e.g., a tracking reference signal (TRS) transmission, a physical downlink control channel (PDCCH) communication, or a physical downlink shared channel (PDSCH) communication), a sidelink communication (e.g., a physical sidelink control channel (PSCCH) communication, or a physical sidelink shared channel (PSSCH) communication), or another suitable type of communication.

As further shown in FIG. 4A, the transmitter node may include an OTFS precoder 408, which may receive a plurality of delay-Doppler symbols (or resource samples) 410 of the communication and convert the delay-Doppler symbols 410 from the delay-Doppler domain 406 to the time-frequency domain 404. In particular, the OTFS precoder 408 may convert or transform the delay-Doppler symbols 410 to time-frequency symbols 412. The delay-Doppler symbols 410 include a block of M×N delay-Doppler QAM symbols that are discretized to an M by N delay-Doppler plane that includes M delay samples and N Doppler shift samples. The time-frequency symbols 412 include a block of M×N OFDM modulated symbols that are spread across M subcarriers and N time symbols.

As further shown in FIG. 4A, the transmitter node may include an OFDM modulator 414. The OFDM modulator 414 may convert or transform the time-frequency symbols 412 from the time-frequency domain 404 to the time domain 402. In particular, the OFDM modulator 414 modulates the time-frequency symbols 412 using an OFDM technique to generate a time domain signal 416 that includes the information of the signal to be transmitted to the receiver node. The time domain signal 416 includes a time-varying signal that includes N symbols, each including M samples. The transmitter node may transmit the time domain signal 416 over a channel 418 (e.g., a wireless channel).

The receiver node receives the time domain signal 416 over the channel 418 from the transmitter node. The receiver node may include an OFDM demodulator 420 that converts or transforms the time domain signal 416 from the time domain 402 to the time-frequency domain 404. In particular, the OFDM demodulator 420 demodulates the time domain signal 416 using an OFDM technique to convert or transform the time domain signal 416 to the time-frequency symbols 412. The receiver node further includes an OTFS decoder 422. The OTFS decoder 422 may convert or transform the time-frequency symbols 412 from the time-frequency domain 404 to the delay-Doppler domain 406. In particular, the OTFS decoder 422 may decode the time-frequency symbols 412 to obtain the delay-Doppler symbols 410.

As shown in FIG. 4B, the OTFS precoder 408 may apply or use a two-dimensional (2D) FFT, referred to as an inverse symplectic FFT (ISFFT), to convert the delay-Doppler symbols 410 to the time-frequency symbols 412. However, other 2D transforms may be used for OTFS precoding to transform or convert the delay-Doppler symbols 410 to the time-frequency symbols 412.

An ISFFT is a 2D transform that includes an inverse FFT (IFFT) 424 and an FFT 426, where the IFFT 424 is applied in one dimension of a delay-Doppler matrix and the FFT 426 is applied in a second dimension of the delay-Doppler matrix. The OTFS precoder 408 uses the IFFT 424 on the M delay samples of the delay-Doppler symbols 410 and uses the FFT 426 on the N Doppler samples of the delay-Doppler symbols 410 to generate the time-frequency symbols 412. The time-frequency symbols 412 are provided to the OFDM modulator 414. The OFDM modulator 414 includes an IFFT 428 that is used to modulate the time-frequency symbols 412 to generate the time domain signal 416. Note that while the example in FIG. 4B illustrates the M delay samples of the delay-Doppler symbols 410 are mapped first and the N Doppler samples of the delay-Doppler symbols 410 are mapped second, the N Doppler samples of the delay-Doppler symbols 410 may be mapped first and the M delay samples of the delay-Doppler symbols 410 may be mapped second. The order has little to no effect on the OTFS precoding performance due to the joint detection in OTFS and constant delay-Doppler channel throughout OTFS. The mapping order can be configured by a base station, can be defined in a wireless communication standard or specification (e.g., a 3GPP specification), and/or negotiated among a UE and a base station, among other examples.

The OFDM demodulator 420 and the OTFS decoder 422 of the base station 110 may perform reverse operations of those shown in FIG. 4B to demodulate and decode the uplink communication. However, the OTFS decoder 422 uses a symplectic FFT (SFFT) (instead of an ISFFT) to convert the time-frequency symbols 412 to the delay-Doppler symbols 410. The SFFT includes a 2D transform similar to the ISFFT, but a non-inverse version. In some aspects, the OTFS decoder 422 uses another type of 2D transform to convert the time-frequency symbols 412 to the delay-Doppler symbols 410.

As indicated above, FIGS. 4A and 4B are provided as examples. Other examples may differ from what is described with respect to FIGS. 4A and 4B.

Figure 5:
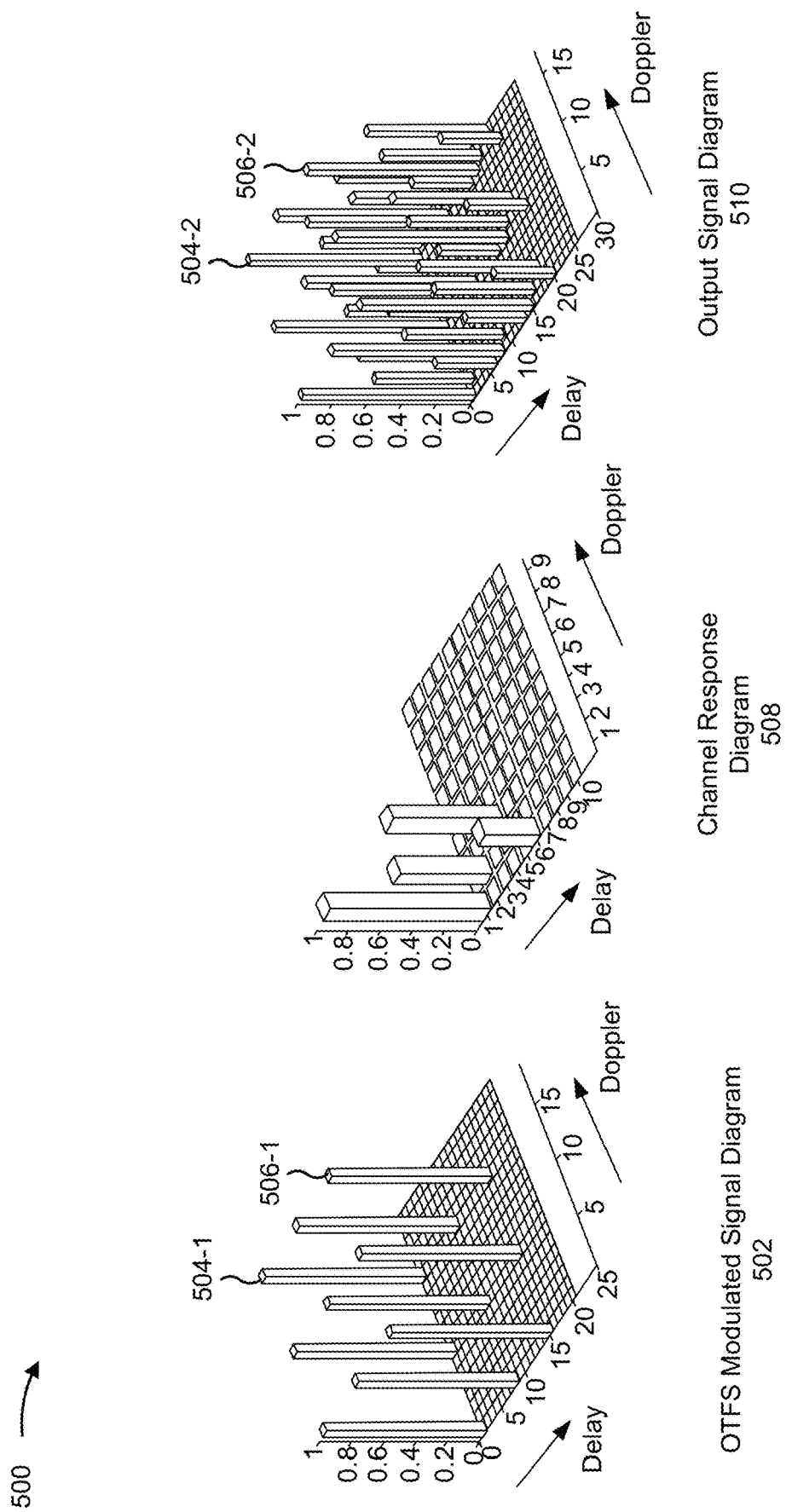
FIG. 5 is a diagram illustrating an example of distortion incurred by an OTFS modulated symbol, in accordance with the present disclosure.

FIG. 5 is a diagram illustrating an example 500 of distortion incurred by an OTFS modulated symbol, in accordance with the present disclosure.

The demand for services provided by a wireless network continues to increase as more and more devices access the wireless network. The availability of communication resources (e.g., frequency resources and/or time resources) to provide these services becomes proportionally strained as the number of devices accessing the wireless network increases. As an added complexity, some devices may request increased data throughput and/or lower data-transfer latency relative to other devices, such as when a device executes an application that consumes large quantities of data and/or has time-sensitive needs (e.g., streaming video, streaming audio, video calling, gaming, and/or emergency services).

OFDM provides more spectral efficiency relative to other modulation schemes which, in turn, enables higher frequency transmissions using OFDM to transmit data with an increased throughput relative to the other modulation schemes. Diverse environments, however, may reduce the throughput gains associated with using OFDM. To illustrate, motion associated with V2X communications may cause spectral broadening (e.g., measured as Doppler spread) that degrades an OFDM signal, reduces a realizable spectral efficiency, and/or reduces data throughput.

Orthogonal time frequency space (OTFS) modulation is a two-dimensional (2D) modulation scheme that modulates information symbols (e.g., a quadrature amplitude modulation (QAM) symbol) in the delay-Doppler domain. An OTFS modulated signal may be less susceptible to spectral broadening, relative to an OFDM modulated signal. Consequently, in environments with high mobility at a transmitter and/or a receiver, OTFS modulation may improve how a receiving device recovers information (e.g., reduces recovery errors) from a signal, relative to OFDM modulation.

The example 500 includes an input signal diagram 502 that illustrates an OTFS modulated signal in the delay-Doppler domain. A first axis of the diagram 502 represents a delay, a second axis of the diagram 502 represents Doppler, and a third axis represents a normalized power. As shown by the diagram 502, each modulated symbol may be represented as an impulse characterized, at least in part, by a respective delay value and a respective Doppler value. To illustrate, a first modulated symbol 504-1 may be represented as a first impulse characterized by a first delay value and first Doppler value, and a second modulated symbol

506-1 may be represented as a second impulse characterized by a second, different delay value and a second, different Doppler value.

The example 500 also illustrates a transmission channel response diagram 508 that characterizes the channel response in the delay-Doppler domain. In the delay-Doppler domain, the transmission channel response may be localized to center (e.g., less delay and/or less Doppler). As the input signal propagates through the transmission channel, the input signal may incur some distortion, which may be estimated through the convolution of the input signal shown by the diagram 502 with the transmission channel response shown by the channel response diagram 508.

Output signal diagram 510 illustrates an example of how the input signal may be altered based at least in part on transmission through the channel. As shown by the diagram 510, the received signal (e.g., the input signal convolved with the channel response) may include a first received symbol 504-2 (e.g., a received version of the first input symbol 504-1) and a second received symbol 506-2 (e.g., a received version of the second input symbol 506-1). Although the received output signal may include additional components relative to the input signal, the received symbol 504-2 and the received symbol 506-2 may incur less distortion in the delay-Doppler domain relative to a time-based symbol. A wireless signal may be represented in the time domain as a function of time, in the frequency domain as a function of frequency, and/or in the delay-Doppler domain as a function of delay and Doppler. Accordingly, various transforms may be applied to convert a signal representation between the delay-Doppler domain to the time domain and/or the frequency domain such that a signal may be initially modulated in the delay-Doppler domain and subsequently transformed into the time domain for transmission. Alternatively or additionally, a received signal may be received in the time domain and converted to the delay-Doppler domain for symbol recovery.

As indicated above, FIG. 5 is provided as an example. Other examples may differ from what is described with regard to FIG. 5.

Figure 6:
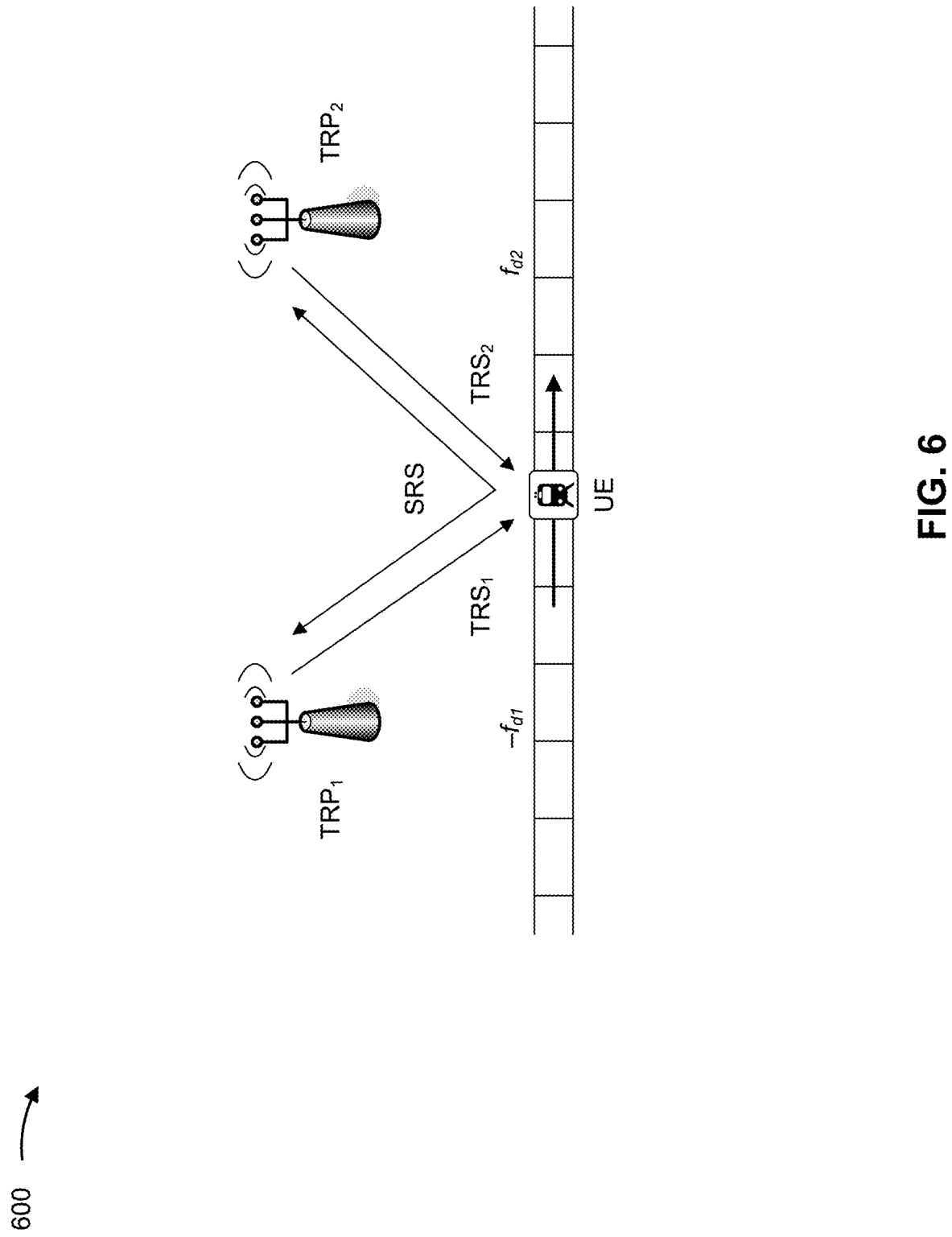
FIG. 6 is a diagram illustrating an example of OFDM for a tracking reference signal (TRS), in accordance with the present disclosure.

FIG. 6 is a diagram illustrating an example 600 of OFDM for a tracking reference signal (TRS), in accordance with the present disclosure. As shown in FIG. 6, example 600 relates to a scenario in which a TRS is used to improve downlink performance for a UE communicating with multiple TRPs (e.g., different DUs and/or RUs associated with a base station or another suitable network node) while moving at a high speed. For example, in 5G NR wireless communication systems, one target use case is to provide high-bandwidth high-capacity wireless access to devices moving at extreme velocities, such as an HST scenario where a UE is mounted on or traveling in a train moving at a speed that may exceed 350 kilometers per hour. At very high speeds, wireless communication performance may be poor due to factors such as high Doppler shifts, inter-carrier interference (ICI), and/or difficulties in channel measurements needed to demodulate downlink signals and obtain mobility measurements, among other examples.

Accordingly, one technique that may be used to improve wireless performance when communicating with a UE moving at a high velocity may be to use a single frequency network (SFN), where different TRPs transmit the same information using the same time and frequency resources. For example, in the high-speed train single frequency network (HST-SFN) scenario shown in FIG. 6, each TRP that communicates with a UE mounted on or traveling in an HST may transmit a DMRS and a physical downlink shared channel (PDSCH) in an SFN manner (e.g., using the same time and frequency resources), which can offer advantages such as better coverage, less interference, and higher reliability. However, in an HST-SFN scenario and/or other scenario(s) where a fast-moving UE communicates with multiple TRPs, RUs, or other network nodes, multiple wireless links will lead to downlink signals from different TRPs having different frequency offsets when the downlink signals arrive at the UE. Accordingly, while various TRPs may transmit a DMRS and PDSCH to a fast-moving UE in an SFN manner, different TRPs may each be configured to transmit a TRS in a TRP-specific, non-SFN manner (e.g., a first TRP, shown as TRP1, transmits a first TRS that is orthogonal to a second TRS transmitted by a second TRP, shown as TRP2). For example, a TRS is a sparse reference signal designed to assist a UE in performing a tracking operation, such as time tracking, frequency tracking, estimated Doppler tracking, and/or delay spread tracking.

As indicated above, FIG. 6 is provided as an example. Other examples may differ from what is described with regard to FIG. 6.

In OTFS modulation, information symbols are transmitted in the delay-Doppler domain to effectively equalize the high-Doppler channels. Due to the delay-Doppler domain transmission, the received symbols are a 2-dimensional (2D) convolution of the delay-Doppler channel relative to the information symbols. In the case of multiple antennas at the transmitter and no transmit precoder, multiple delay-Doppler channels effectively combine with one another at the receiver. This introduces fading at the receiver as the paths from multiple antennas add or cancel each other.

Some techniques and apparatuses described herein provide receiving an indication of at least one of an amount of delay or an amount of Doppler shift, in a delay-Doppler domain, of a signal transmission; and receiving, in a time-frequency domain, a first signal from a first antenna and a second signal from a second antenna, wherein the second signal is shifted in the delay-Doppler domain, relative to the first signal, by the at least one of the amount of delay or the amount of Doppler shift. Providing open-loop precoding with cyclic delay and/or Doppler shifts reduces the chances of adding dominant paths from different antennas, which helps avoid fading at the receiver. Moreover, incorporating a cyclic Doppler shift does not increase the DMRS allocation in the Doppler domain. An increase in DMRS allocation would decrease the amount of data that could be transmitted.

Some techniques and apparatuses described herein provide applying at least one of an amount of delay or an amount of Doppler shift to a signal transmission. The signal transmission includes a first signal for transmission from a first antenna and a second signal for transmission from a second antenna. The second signal is shifted, relative to the first signal, in a delay-Doppler domain, by the at least one of the amount of delay or the amount of Doppler shift; and outputting, in a time-frequency domain, the first signal from the first antenna and the second signal from a second antenna. This form of open-loop precoding with cyclic delay and/or Doppler shifts helps coordinate transmissions from multiple antennas to avoid fading at the UE. Moreover, network performance can be improved by allocating more symbols for DMRS, which can facilitate a larger amount of delay and/or a larger amount of Doppler shift between antennas.

Figure 7:
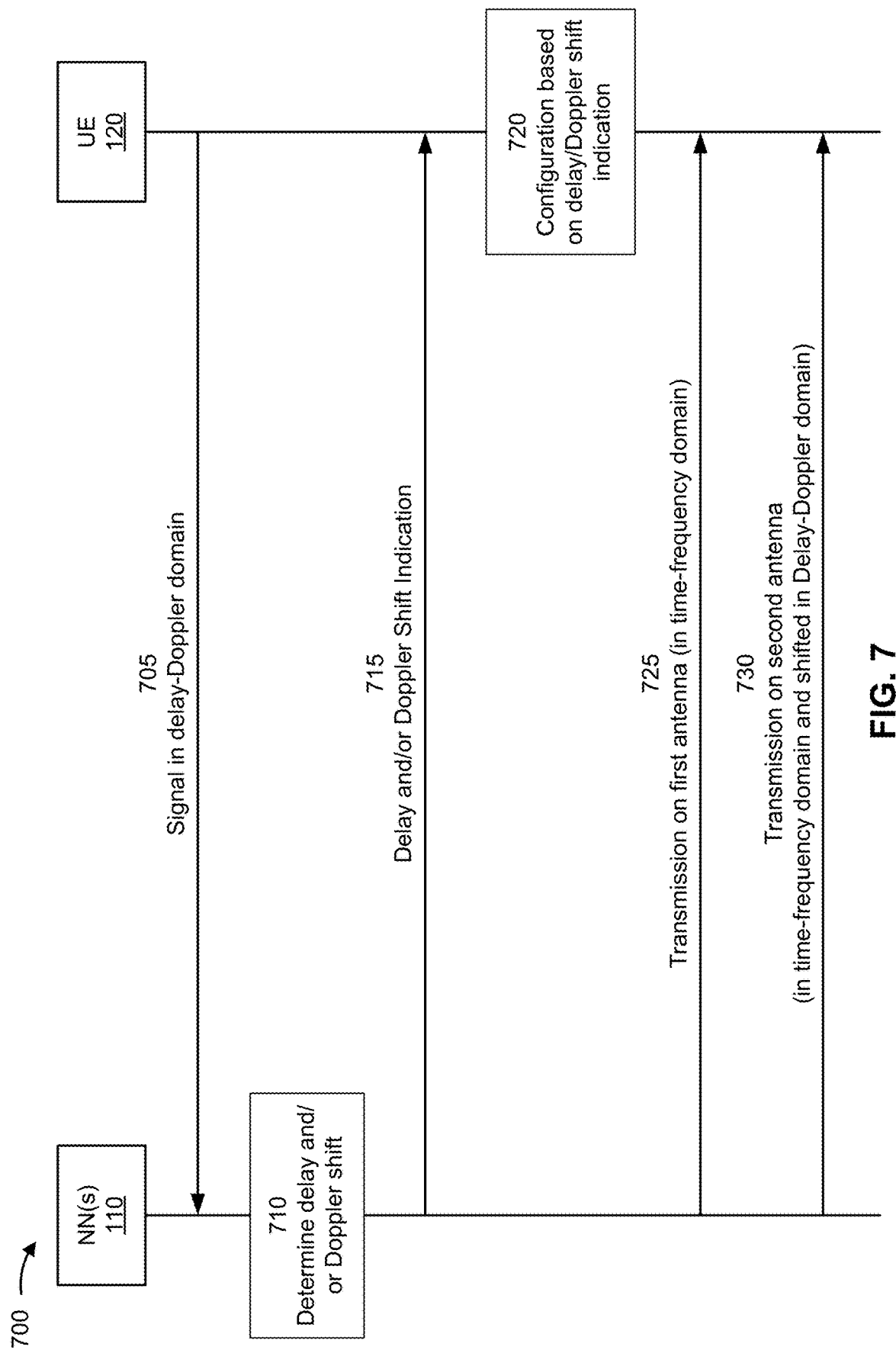
FIG. 7 is a diagram illustrating an example associated with cyclic delay and Doppler shift for OTFS open-loop precoding, in accordance with the present disclosure.

FIG. 7 is a diagram illustrating an example 700 associated with cyclic delay and Doppler shift for, e.g., OTFS open-loop precoding, in accordance with the present disclosure.

As shown in FIG. 7, a network node 110 and a UE 120 may communicate with one another.

As shown by reference number 705, the UE may transmit, and the network node may receive, a signal with symbols in the delay-Doppler domain (i.e., delay-Doppler domain information symbols). The delay-Doppler domain information symbols may be communicated on an uplink channel.

As shown by reference number 710, the network node may determine a delay and/or Doppler shift appropriate for transmissions from multiple antennas. In some aspects, the network node may introduce a delay, Doppler shift, or both, to information symbols to transmissions from one or more antennas. In some aspects, the delay and/or Doppler shift, or a combination thereof, may be different for each antenna. In some aspects, the network node may determine that no delay or Doppler shift should be applied to transmissions from one antenna, while a delay and/or Doppler shift should be applied to transmissions from another antenna. In some aspects, the delay and/or Doppler shift may be coordinated between remote radio heads (RRHs) of multiple antennas. In some aspects, the delay and/or Doppler shift may be cyclic. As used herein, "cyclic" means that the delay and/or Doppler shift values applied to transmissions may periodically repeat. Since DMRS allocation in the delay domain is equal to two times the maximum delay spread, increasing the delay spread increases the required DMRS resources. Periodically repeating the delay values can reduce DMRS allocation in the delay domain. Periodically repeating Doppler shift values reduces the likelihood of adding dominant paths from different antennas.

In some aspects, the network node may determine the amount of delay and/or Doppler shift based on various factors associated with, for example, the physical characteristics of the network node, characteristics of a communication channel, or the like. For instance, the network node may determine the amount of delay and/or Doppler shift based on the channel delay and Doppler spread information, the number of transmit antennas, the number of symbols allocated for DMRS, and/or a combination thereof. In some aspects, as more symbols are allocated for DMRS, the network node may apply a larger delay shift between antennas to improve performance. Likewise, as fewer symbols are allocated for DMRS, the network node may apply a lower delay shift between antennas. In some aspects, network nodes with more antennas may apply a reduced delay relative to network nodes with fewer antennas, which may apply a higher delay. In some aspects, the network node may apply a larger delay shift between antennas if, for example, the channel has a lower delay spread and a smaller delay shift between antennas if, for example, the channel has a higher delay spread. The amount of Doppler shift may depend on the number of antennas, Doppler spread, and DMRS allocation in the Doppler dimension. In some aspects, network nodes with more antennas may apply a reduced Doppler shift relative to network nodes with fewer antennas, which may apply a higher Doppler shift. In some aspects, the network node may apply a larger Doppler shift between antennas if, for example, the channel has a lower Doppler spread and a smaller Doppler shift between antennas if, for example, the channel has a higher Doppler spread.

Because a cyclic delay shift may increase the overall maximum delay spread at the receiver of the UE, the network node may be configured to determine that a delay should be applied without Doppler shift in situations where DMRS resources can be allocated to cover the increase in delay spread. In situations where the increased delay spread can adversely affect network performance, the network node may be configured to determine that a Doppler shift should be applied with no delay. Further, in some aspects, such as the high-speed rail example discussed above with respect to FIG. 6, the network node may be configured to determine that both a delay and Doppler shift may be applied. In some aspects, the network nodes may be configured such that a cyclic Doppler shift is applied to one group of antennas and a cyclic delay is applied to another group of antennas. Within each group, the network nodes may be configured such that different antennas may apply a different cyclic Doppler shift, a different cyclic delay, or a combination of both.

As shown by reference number 715, the network node may transmit, and the UE may receive, an indication of the delay and/or Doppler shift applied to each antenna. The indication of the delay and/or Doppler shift that is applied to each antenna may be transmitted via downlink control information (DCI) signaling.

As shown by reference number 720, the UE may apply configurations according to the delay and/or Doppler shift applied to each antenna so transmissions from each antenna can be received without interference from transmissions from another nearby antenna. The configurations may be applied according to the received indication shown by reference number 715. An example of how the configurations may be applied is discussed below with reference to FIGS. 8 and 9.

As shown by reference number 725, the network node may transmit, and the UE may receive, a communication from a first antenna. The communication from the first antenna may apply the delay and/or Doppler shift indicated via the DCI signaling shown by reference number 715. In some aspects, no delay or Doppler shift is applied to communications from the first antenna.

As shown by reference number 730, the network node may transmit, and the UE may receive, a communication from a second antenna. The communication from the second antenna may apply the delay and/or Doppler shift indicated via the DCI signaling shown by reference number 715. In some aspects, the delay and/or Doppler shift applied to the communication from the second antenna is different from the delay and/or Doppler shift applied to the communication from the first antenna. Accordingly, communications from the first antenna are less likely to interfere with communications from the second antenna, particularly in instances where the UE is moving relative to the antennas, such as the example shown at 600 and discussed above with reference to FIG. 6.

As indicated above, FIG. 7 is provided as an example. Other examples may differ from what is described with respect to FIG. 7.

Figure 8:
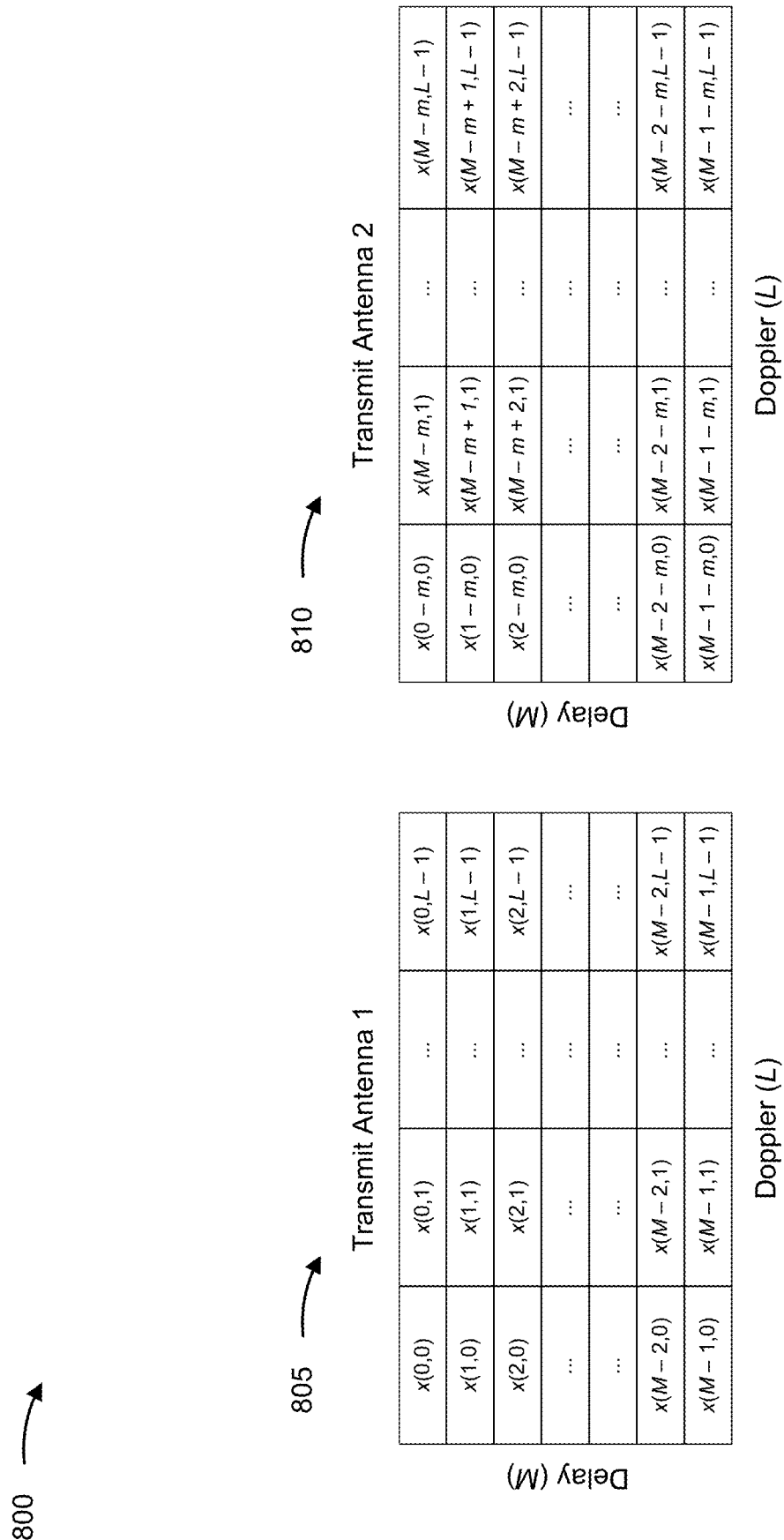
FIG. 8 is a diagram illustrating an example associated with cyclic delay shift for OTFS open-loop precoding, in accordance with the present disclosure.

FIG. 8 is a diagram illustrating an example 800 associated with cyclic delay shift for OTFS open-loop precoding, in accordance with the present disclosure. As shown in FIG. 8, example 800 includes tables representing communications in the delay and Doppler domain for a first antenna (shown at table 805) and for a second antenna (shown at table 810). As shown at table 810, a delay m is applied to the communications from the second antenna. For example, a different cyclical shift in the delay domain information symbols is applied to the communications from the second antenna relative to communications from the first antenna. In some aspects, no delay shift is applied to the delay-Doppler domain information symbols for the first antenna (table 805) while a cyclic delay shift of m is applied to communications from the second antenna (table 810). Due to the cyclic delay shift, the effective delay channel of the second antenna will be shifted, which reduces the chances of adding dominant paths from different antennas. As indicated above, FIG. 8 is provided as an example. Other examples may differ from what is described with respect to FIG. 8.

The delay m applied to the communications from the second antenna may increase the overall delay spread at the receiver. Since in OTFS, DMRS allocation in the delay domain is equal to two times the maximum delay spread, the increase in delay spread may increase the required number of DMRS resources. To reduce the DMRS allocation in the delay domain, a Doppler shift (see FIG. 9) may be used instead of or in addition to the delay shift shown and discussed with reference to FIG. 8 since, in some OTFS applications, DMRS allocation in the Doppler domain is fixed to the maximum Doppler dimension. Accordingly, cyclic Doppler shift does not increase the DMRS allocation in the Doppler domain.

Figure 9:
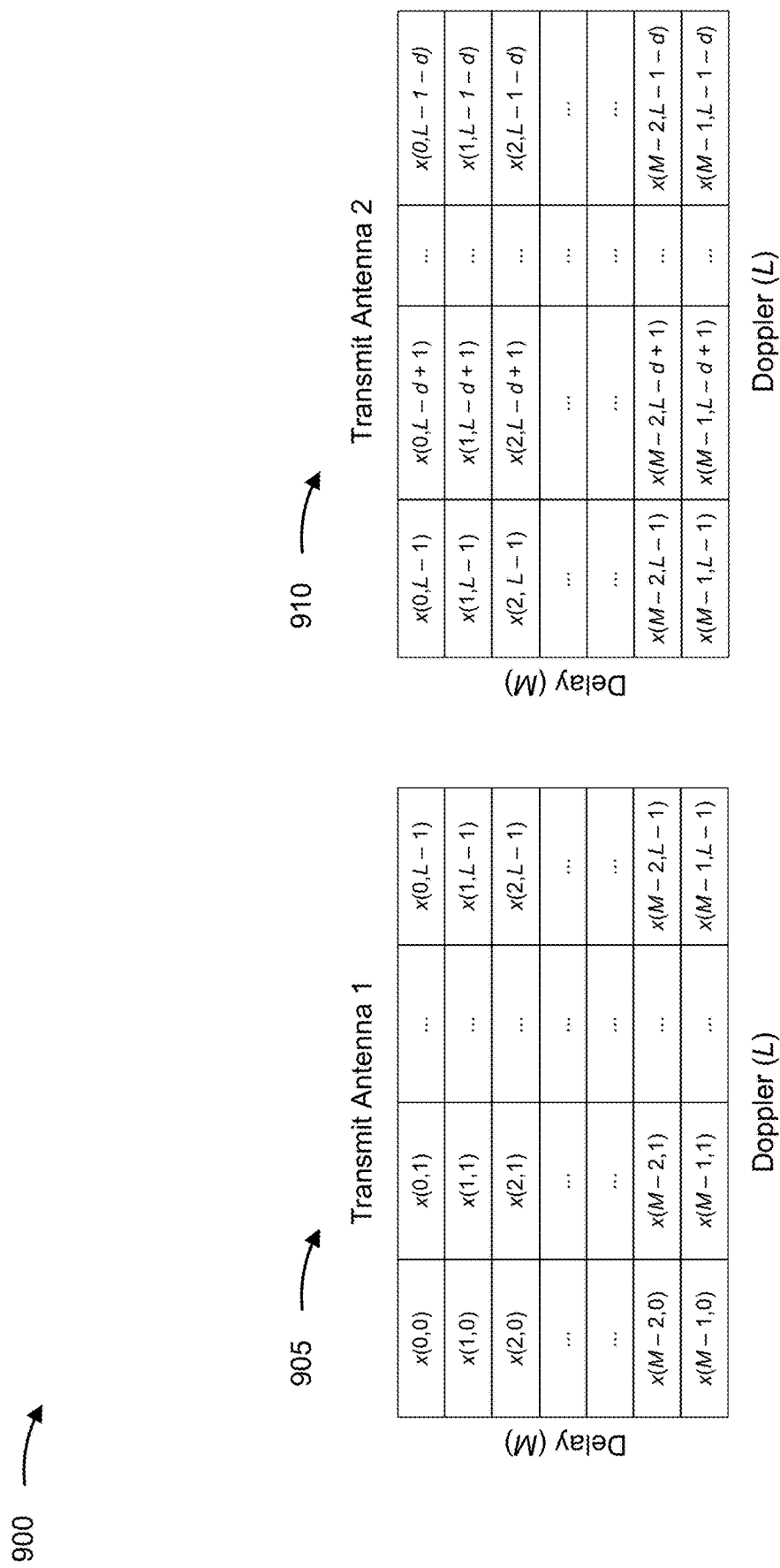
FIG. 9 is a diagram illustrating an example associated with cyclic Doppler shift for OTFS open-loop precoding, in accordance with the present disclosure.

FIG. 9 is a diagram illustrating an example 900 associated with cyclic Doppler shift for OTFS open-loop precoding, in accordance with the present disclosure. As shown in FIG. 9, example 900 includes tables representing communications in the delay and Doppler domain for a first antenna (shown at table 905) and for a second antenna (shown at table 910). As shown at table 910, a Doppler shift d is applied to the communications from the second antenna. For example, a different cyclical shift in the Doppler domain information symbols is applied to the communications from the second antenna relative to communications from the first antenna. In some aspects, no Doppler shift is applied to the delay-Doppler domain information symbols for the first antenna (table 905) while a cyclic Doppler shift of dis applied to communications from the second antenna (table 910). Due to the cyclic Doppler shift, the effective Doppler channel of the second antenna will be shifted, which reduces the chances of adding dominant paths from different antennas. As indicated above, FIG. 9 is provided as an example. Other examples may differ from what is described with respect to FIG. 9.

In some aspects, combinations of both cyclic delay and Doppler shift may be used to improve network performance. For example, in the high-speed-train single-frequency network example (discussed above with reference to FIG. 6) with a UE in communication with multiple RRHs, a cyclic Doppler shift may be used among a group of antennas between one pair of RRHs and a cyclic delay shift may be coordinated among a group of antennas between another pair of RRHs. Even within the same group, different antennas may apply different cyclic delay and/or Doppler shifts.

Figure 10:
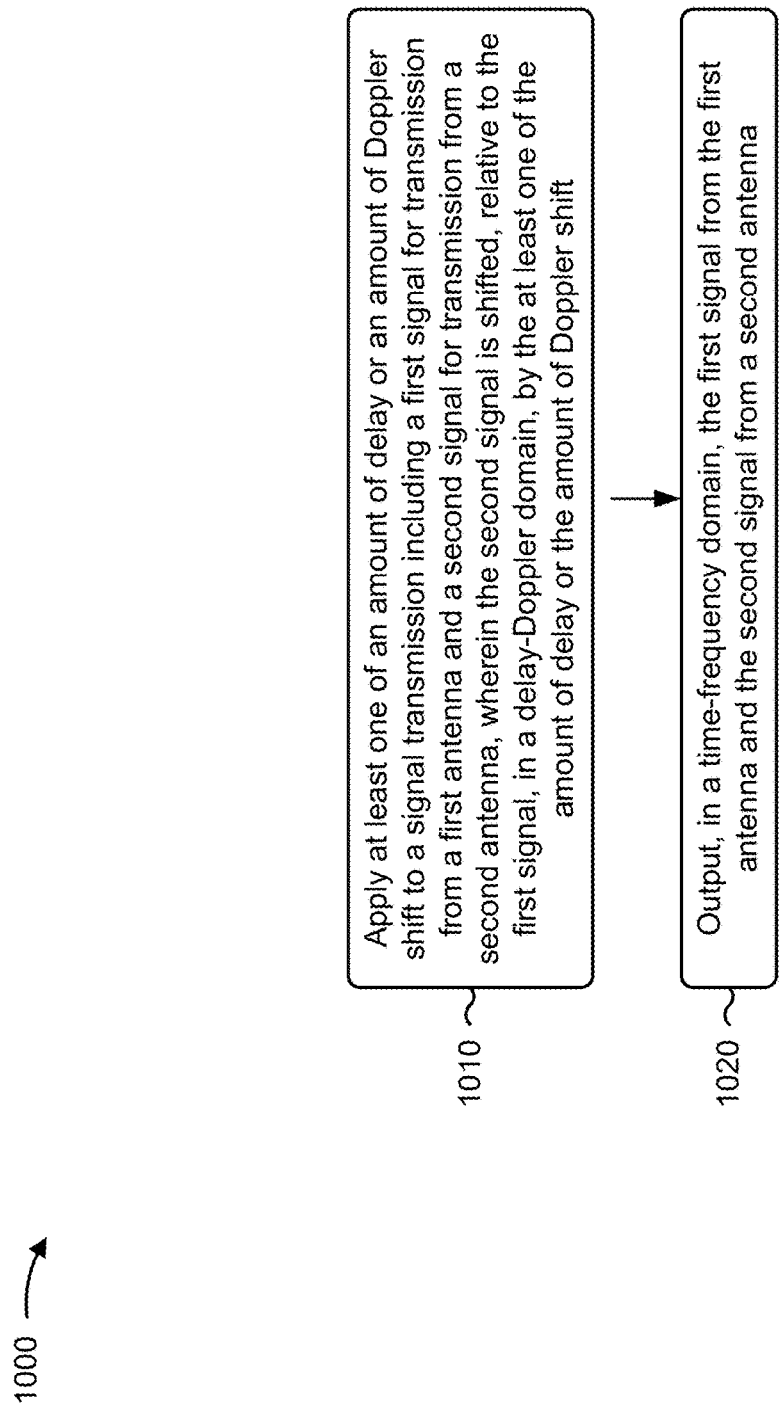
FIG. 10 is a diagram illustrating an example process performed, for example, by a transmitter, in accordance with the present disclosure.

FIG. 10 is a diagram illustrating an example process 1000 performed, for example, by a transmitter, in accordance with the present disclosure. Example process 1000 is an example where the transmitter (e.g., network node 110) performs operations associated with cyclic delay and Doppler shift for open-loop precoding.

As shown in FIG. 10, in some aspects, process 1000 may include applying at least one of an amount of delay or an amount of Doppler shift to a signal transmission including a first signal for transmission from a first antenna and a second signal for transmission from a second antenna, wherein the second signal is shifted, relative to the first signal, in a delay-Doppler domain, by the at least one of the amount of delay or the amount of Doppler shift (block 1010). For example, the transmitter (e.g., using communication manager 150 and/or shift component 1208, depicted in FIG. 12) may apply at least one of an amount of delay or an amount of Doppler shift to a signal transmission including a first signal for transmission from a first antenna and a second signal for transmission from a second antenna, wherein the second signal is shifted, relative to the first signal, in a delay-Doppler domain, by the at least one of the amount of delay or the amount of Doppler shift, as described above.

As further shown in FIG. 10, in some aspects, process 1000 may include outputting, in a time-frequency domain, the first signal from the first antenna and the second signal from a second antenna (block 1020). For example, the transmitter (e.g., using communication manager 150 and/or transmission component 1204, depicted in FIG. 12) may output, in a time-frequency domain, the first signal from the first antenna and the second signal from a second antenna, as described above.

Process 1000 may include additional aspects, such as any single aspect or any combination of aspects described below and/or in connection with one or more other processes described elsewhere herein.

In a first aspect, process 1000 includes coordinating the at least one of the amount of the delay or the amount of Doppler shift between a remote radio head of the first antenna and a remote radio head of the second antenna.

In a second aspect, alone or in combination with the first aspect, the at least one of the amount of delay or the amount of Doppler shift is cyclical.

In a third aspect, alone or in combination with one or more of the first and second aspects, the at least one of the amount of delay or the amount of Doppler shift is based at least in part on a channel delay.

In a fourth aspect, alone or in combination with one or more of the first through third aspects, the at least one of the amount of delay or the amount of Doppler shift is based at least in part on a Doppler spread.

In a fifth aspect, alone or in combination with one or more of the first through fourth aspects, the at least one of the amount of delay or the amount of Doppler shift is based at least in part on a number of transmit antennas.

In a sixth aspect, alone or in combination with one or more of the first through fifth aspects, process 1000 includes receiving, from a UE, the delay-Doppler domain information symbols on an uplink channel.

In a seventh aspect, alone or in combination with one or more of the first through sixth aspects, applying the at least one of the delay or the amount of Doppler shift is a result of receiving, from the UE, the delay-Doppler domain information symbols on the uplink channel.

In an eighth aspect, alone or in combination with one or more of the first through seventh aspects, the at least one of the amount of delay or the amount of Doppler shift is based at least in part on a number of symbols allocated for a DMRS.

In a ninth aspect, alone or in combination with one or more of the first through eighth aspects, process 1000 includes transmitting, via downlink control information (DCI), an indication of the at least one of the amount of delay or the amount of Doppler shift.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
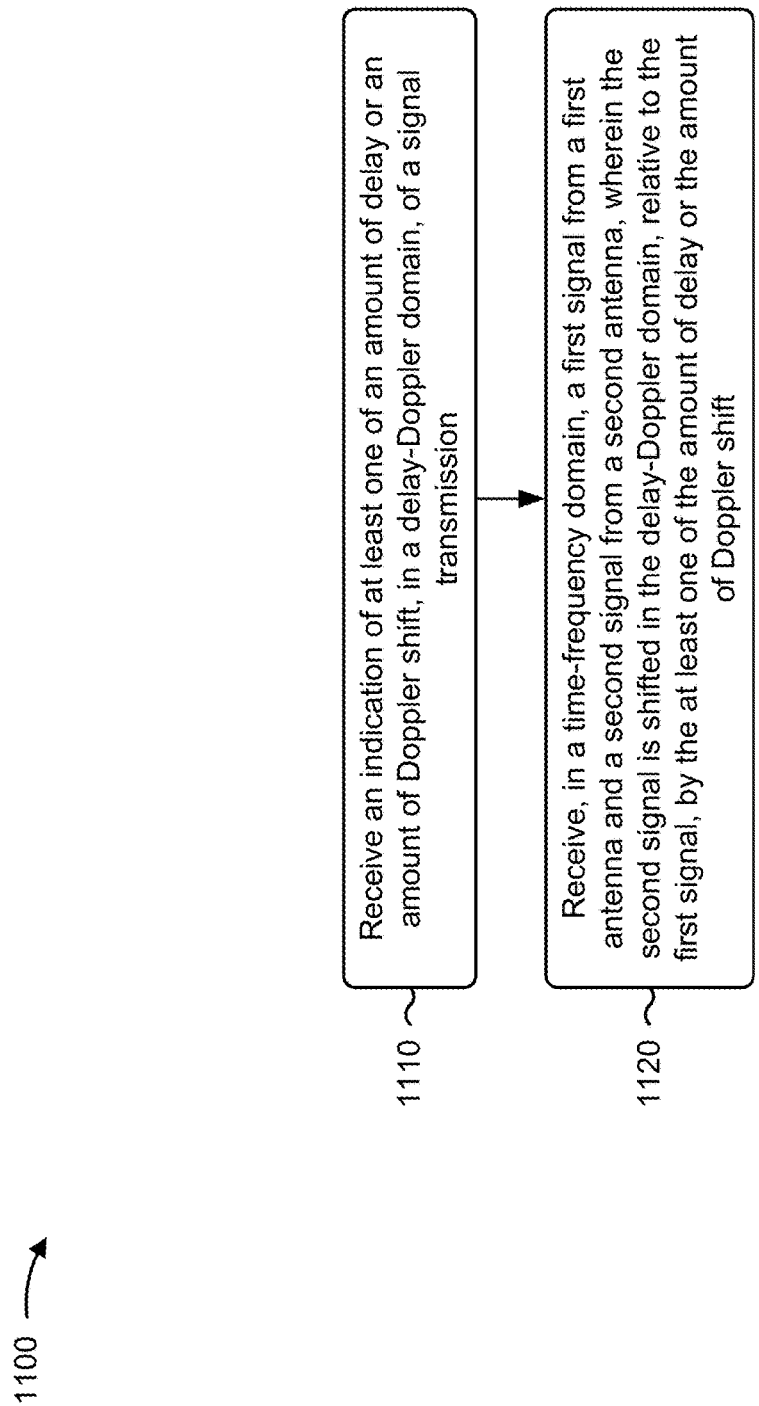
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with cyclic delay and Doppler shift for open-loop precoding.

As shown in FIG. 11, in some aspects, process 1100 may include receiving an indication of at least one of an amount of delay or an amount of Doppler shift, in a delay-Doppler domain, of a signal transmission (block 1110). For example, the UE (e.g., using communication manager 140 and/or reception component 1302, depicted in FIG. 13) may receive an indication of at least one of an amount of delay or an amount of Doppler shift, in a delay-Doppler domain, of a signal transmission, as described above.

As further shown in FIG. 11, in some aspects, process 1100 may include receiving, in a time-frequency domain, a first signal from a first antenna and a second signal from a second antenna, wherein the second signal is shifted in the delay-Doppler domain, relative to the first signal, by the at least one of the amount of delay or the amount of Doppler shift (block 1120). For example, the UE (e.g., using communication manager 140 and/or reception component 1302, depicted in FIG. 13) may receive, in a time-frequency domain, a first signal from a first antenna and a second signal from a second antenna, wherein the second signal is shifted in the delay-Doppler domain, relative to the first signal, by the at least one of the amount of delay or the amount of Doppler shift, as described above.

Process 1100 may include additional aspects, such as any single aspect or any combination of aspects described below and/or in connection with one or more other processes described elsewhere herein.

In a first aspect, process 1100 includes transmitting delay-Doppler domain information symbols on an uplink channel.

In a second aspect, alone or in combination with the first aspect, receiving the indication of the at least one of the amount of delay or the amount of Doppler shift is a result of transmitting the delay-Doppler domain information symbols on the uplink channel.

In a third aspect, alone or in combination with one or more of the first and second aspects, the at least one of the amount of delay or the amount of Doppler shift is based at least in part on a number of symbols allocated for a DMRS.

In a fourth aspect, alone or in combination with one or more of the first through third aspects, the indication of the at least one of the amount of delay or the amount of Doppler shift is received via DCI signaling.

In a fifth aspect, alone or in combination with one or more of the first through fourth aspects, the at least one of the amount of delay or the amount of Doppler shift is cyclical.

In a sixth aspect, alone or in combination with one or more of the first through fifth aspects, the at least one of the amount of delay or the amount of Doppler shift is based at least in part on a channel delay.

In a seventh aspect, alone or in combination with one or more of the first through sixth aspects, the at least one of the amount of delay or the amount of Doppler shift is based at least in part on a Doppler spread.

In an eighth aspect, alone or in combination with one or more of the first through seventh aspects, the at least one of the amount of delay or the amount of Doppler shift is based at least in part on a number of transmit antennas.

In a ninth aspect, alone or in combination with one or more of the first through eighth aspects, process 1100 includes transmitting DMRS resources as a function of a precoder.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
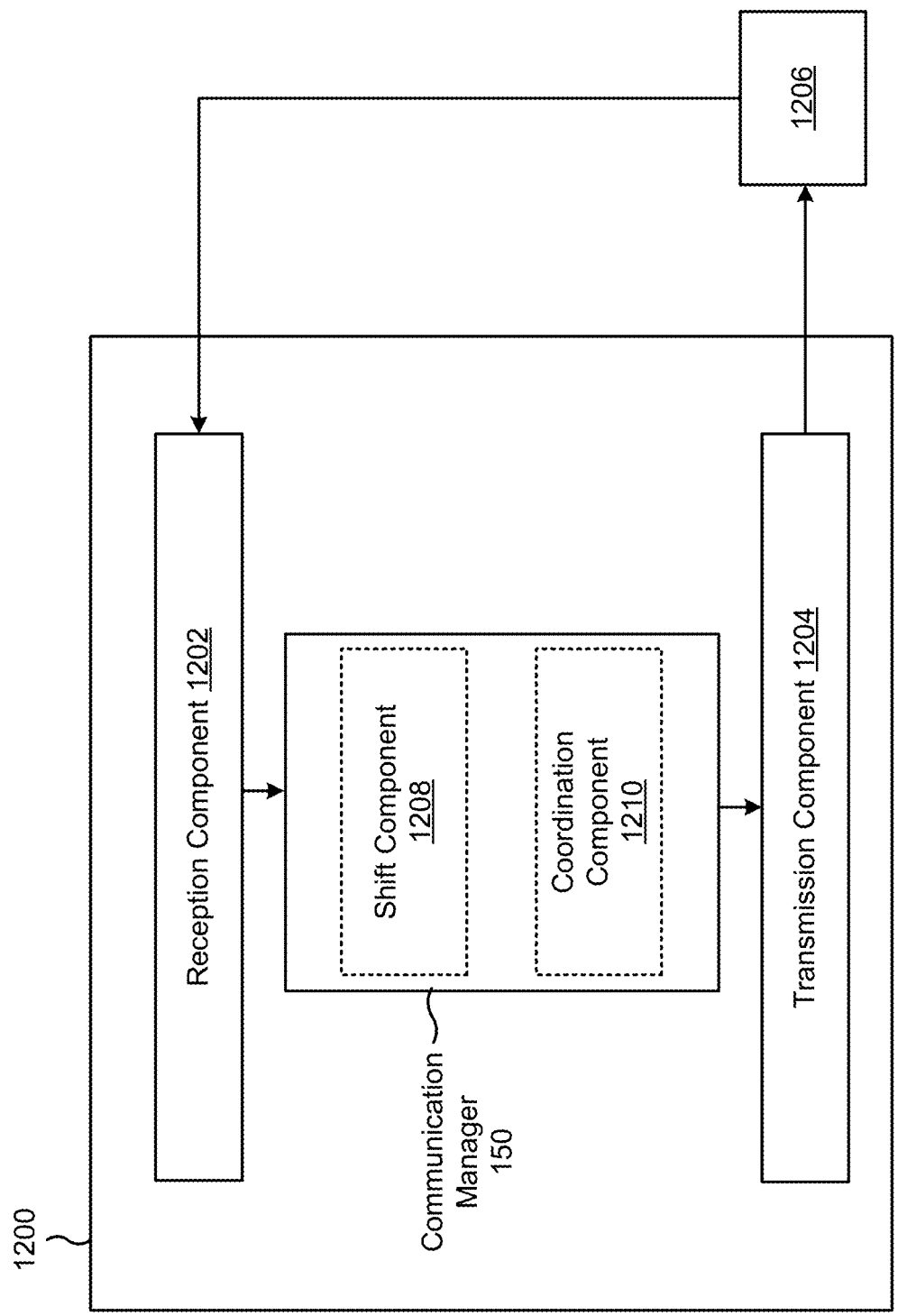
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a transmitter (e.g., network node 110), or a transmitter may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150) may include one or more of a shift component 1208, or a coordination component 1210, among other examples.

In some aspects, the apparatus 1200 may be configured to perform one or more operations described herein in connection with FIGS. 4A-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the transmitter described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the transmitter described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the transmitter described in connection with FIG. 2. In some aspects, the transmission component 1204 may be co-located with the reception component 1202 in a transceiver.

The shift component 1208 may apply at least one of an amount of delay or an amount of Doppler shift to a signal transmission including a first signal for transmission from a first antenna and a second signal for transmission from a second antenna, wherein the second signal is shifted, relative to the first signal, in a delay-Doppler domain, by the at least one of the amount of delay or the amount of Doppler shift. The transmission component 1204 may output, in a time-frequency domain, the first signal from the first antenna and the second signal from a second antenna.

The coordination component 1210 may coordinate the at least one of the amount of the delay or the amount of Doppler shift between a remote radio head of the first antenna and a remote radio head of the second antenna.

The reception component 1202 may receive, from a UE, the delay-Doppler domain information symbols on an uplink channel.

The transmission component 1204 may transmit, via DCI, an indication of the at least one of the amount of delay or the amount of Doppler shift.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
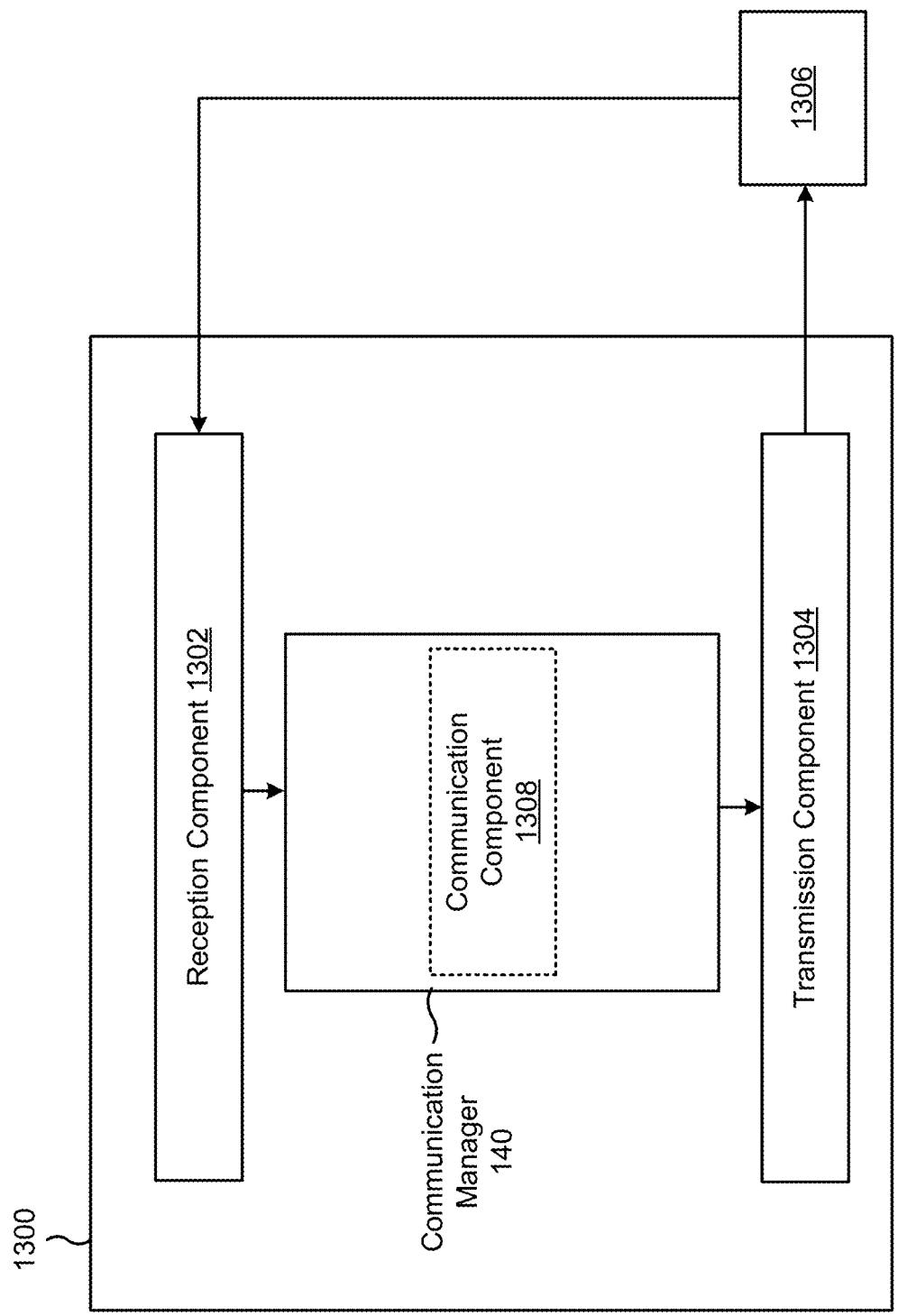
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include a communication component 1308, among other examples.

In some aspects, the apparatus 1300 may be configured to perform one or more operations described herein in connection with FIGS. 4A-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software components stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive an indication of at least one of an amount of delay or an amount of Doppler shift, in a delay-Doppler domain, of a signal transmission. The reception component 1302 may receive, in a time-frequency domain, a first signal from a first antenna and a second signal from a second antenna, wherein the second signal is shifted in the delay-Doppler domain, relative to the first signal, by the at least one of the amount of delay or the amount of Doppler shift.

The transmission component 1304 may transmit delay-Doppler domain information symbols on an uplink channel. The delay-Doppler domain information symbols (e.g., information symbols for transmission in the delay-Doppler domain) may be generated by the communication component 1308.

The transmission component 1304 may transmit DMRS resources as a function of a precoder.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a transmitter, comprising: applying at least one of an amount of delay or an amount of Doppler shift to a signal transmission including a first signal for transmission from a first antenna and a second signal for transmission from a second antenna, wherein the second signal is shifted, relative to the first signal, in a delay-Doppler domain, by the at least one of the amount of delay or the amount of Doppler shift; and outputting, in a time-frequency domain, the first signal from the first antenna and the second signal from a second antenna.

Aspect 2: The method of Aspect 1, further comprising coordinating the at least one of the amount of the delay or the amount of Doppler shift between a remote radio head of the first antenna and a remote radio head of the second antenna.

Aspect 3: The method of any of Aspects 1-2, wherein the at least one of the amount of delay or the amount of Doppler shift is cyclical.

Aspect 4: The method of any of Aspects 1-3, wherein the at least one of the amount of delay or the amount of Doppler shift is based at least in part on a channel delay.

Aspect 5: The method of any of Aspects 1-4, wherein the at least one of the amount of delay or the amount of Doppler shift is based at least in part on a Doppler spread.

Aspect 6: The method of any of Aspects 1-5, wherein the at least one of the amount of delay or the amount of Doppler shift is based at least in part on a number of transmit antennas.

Aspect 7: The method of any of Aspects 1-6, further comprising receiving, from a user equipment (UE), the delay-Doppler domain information symbols on an uplink channel.

Aspect 8: The method of Aspect 7, wherein applying the at least one of the delay or the amount of Doppler shift is a result of receiving, from the UE, the delay-Doppler domain information symbols on the uplink channel.

Aspect 9: The method of any of Aspects 1-8, wherein the at least one of the amount of delay or the amount of Doppler shift is based at least in part on a number of symbols allocated for a DMRS.

Aspect 10: The method of any of Aspects 1-9, further comprising transmitting, via DCI, an indication of the at least one of the amount of delay or the amount of Doppler shift.

Aspect 11: A method of wireless communication performed by an apparatus of a user equipment (UE), comprising: receiving an indication of at least one of an amount of delay or an amount of Doppler shift, in a delay-Doppler domain, of a signal transmission; and receiving, in a time-frequency domain, a first signal from a first antenna and a second signal from a second antenna, wherein the second signal is shifted in the delay-Doppler domain, relative to the first signal, by the at least one of the amount of delay or the amount of Doppler shift.

Aspect 12: The method of Aspect 11, further comprising transmitting delay-Doppler domain information symbols on an uplink channel.

Aspect 13: The method of any of Aspects 11-12, wherein receiving the indication of the at least one of the amount of delay or the amount of Doppler shift is a result of transmitting the delay-Doppler domain information symbols on the uplink channel.

Aspect 14: The method of Aspect 13, wherein the at least one of the amount of delay or the amount of Doppler shift is based at least in part on a number of symbols allocated for a DMRS.

Aspect 15: The method of Aspect 13, wherein the indication of the at least one of the amount of delay or the amount of Doppler shift is received via DCI signaling.

Aspect 16: The method of any of Aspects 11-15, wherein the at least one of the amount of delay or the amount of Doppler shift is cyclical.

Aspect 17: The method of any of Aspects 11-16, wherein the at least one of the amount of delay or the amount of Doppler shift is based at least in part on a channel delay.

Aspect 18: The method of any of Aspects 11-17, wherein the at least one of the amount of delay or the amount of Doppler shift is based at least in part on a Doppler spread.

Aspect 19: The method of any of Aspects 11-18, wherein the at least one of the amount of delay or the amount of Doppler shift is based at least in part on a number of transmit antennas.

Aspect 20: The method of any of Aspects 11-19, further comprising transmitting DMRS resources as a function of a precoder.

Aspect 21: An apparatus for wireless communication at a device, comprising a processor; memory coupled with the processor; and instructions stored in the memory and executable by the processor to cause the apparatus to perform the method of one or more of Aspects 1-20.

Aspect 22: A device for wireless communication, comprising a memory and one or more processors coupled to the memory, the one or more processors configured to perform the method of one or more of Aspects 1-20.

Aspect 23: An apparatus for wireless communication, comprising at least one means for performing the method of one or more of Aspects 1-20.

Aspect 24: A non-transitory computer-readable medium storing code for wireless communication, the code comprising instructions executable by a processor to perform the method of one or more of Aspects 1-20.

Aspect 25: A non-transitory computer-readable medium storing a set of instructions for wireless communication, the set of instructions comprising one or more instructions that, when executed by one or more processors of a device, cause the device to perform the method of one or more of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transmitter for wireless communication, comprising:
   a memory; and
   one or more processors, coupled to the memory, configured to:
      apply at least one of an amount of delay or an amount of Doppler shift to a signal transmission including a first signal for transmission from a first antenna and a second signal for transmission from a second antenna, wherein the second signal is shifted, relative to the first signal, in a delay-Doppler domain, by the at least one of the amount of delay or the amount of Doppler shift;
      output, in a time-frequency domain, the first signal from the first antenna and the second signal from the second antenna; and
      coordinate the at least one of the amount of the delay or the amount of Doppler shift between a remote radio head of the first antenna and a remote radio head of the second antenna.

2. The transmitter of claim 1, wherein the at least one of the amount of delay or the amount of Doppler shift is cyclical.

3. The transmitter of claim 1, wherein the at least one of the amount of delay or the amount of Doppler shift is based at least in part on a channel delay.

4. The transmitter of claim 1, wherein the at least one of the amount of delay or the amount of Doppler shift is based at least in part on a Doppler spread.

5. The transmitter of claim 1, wherein the at least one of the amount of delay or the amount of Doppler shift is based at least in part on a number of transmit antennas.

6. The transmitter of claim 1, wherein the one or more processors are further configured to receive, from a user equipment (UE), the delay-Doppler domain information symbols on an uplink channel.

7. The transmitter of claim 6, wherein applying the at least one of the delay or the amount of Doppler shift is a result of receiving, from the UE, the delay-Doppler domain information symbols on the uplink channel.

8. A transmitter for wireless communication, comprising:
   a memory; and
   one or more processors, coupled to the memory, configured to:
      apply at least one of an amount of delay or an amount of Doppler shift to a signal transmission including a first signal for transmission from a first antenna and a second signal for transmission from a second antenna, wherein the second signal is shifted, relative to the first signal, in a delay-Doppler domain, by the at least one of the amount of delay or the amount of Doppler shift; and
      output, in a time-frequency domain, the first signal from the first antenna and the second signal from the second antenna;
      wherein the at least one of the amount of delay or the amount of Doppler shift is based at least in part on a number of symbols allocated for a demodulation reference signal (DMRS).

9. The transmitter of claim 1, wherein the one or more processors are further configured to transmit, via downlink control information (DCI), an indication of the at least one of the amount of delay or the amount of Doppler shift.

10. A user equipment (UE) for wireless communication, comprising:
    a memory; and
    one or more processors, coupled to the memory, configured to:
       receive an indication of at least one of an amount of delay or an amount of Doppler shift, in a delay-Doppler domain, of a signal transmission; and
       receive, in a time-frequency domain, a first signal from a first antenna and a second signal from a second antenna, wherein the second signal is shifted in the delay-Doppler domain, relative to the first signal, by the at least one of the amount of delay or the amount of Doppler shift; and
       transmit delay-Doppler domain information symbols on an uplink channel;

wherein receiving the indication of the at least one of the amount of delay or the amount of Doppler shift is a result of transmitting the delay-Doppler domain information symbols on the uplink channel;

wherein the at least one of the amount of delay or the amount of Doppler shift is based at least in part on a number of symbols allocated for a demodulation reference signal (DMRS).

11. The UE of claim 10, wherein the indication of the at least one of the amount of delay or the amount of Doppler shift is received via downlink control information (DCI) signaling.

12. The UE of claim 10, wherein the at least one of the amount of delay or the amount of Doppler shift is cyclical.

13. The UE of claim 10, wherein the at least one of the amount of delay or the amount of Doppler shift is based at least in part on a channel delay.

14. The UE of claim 10, wherein the at least one of the amount of delay or the amount of Doppler shift is based at least in part on a Doppler spread.

15. The UE of claim 10, wherein the at least one of the amount of delay or the amount of Doppler shift is based at least in part on a number of transmit antennas.

16. The UE of claim 10, wherein the one or more processors are further configured to transmit demodulation reference signal (DMRS) resources as a function of a precoder.

17. A method of wireless communication performed by a transmitter, comprising:
applying at least one of an amount of delay or an amount of Doppler shift to a signal transmission including a first signal for transmission from a first antenna and a second signal for transmission from a second antenna, wherein the second signal is shifted, relative to the first signal, in a delay-Doppler domain, by the at least one of the amount of delay or the amount of Doppler shift;
outputting, in a time-frequency domain, the first signal from the first antenna and the second signal from the second antenna; and
coordinating the at least one of the amount of the delay or the amount of Doppler shift between a remote radio head of the first antenna and a remote radio head of the second antenna.

18. The method of claim 17, wherein the at least one of the amount of delay or the amount of Doppler shift is cyclical.

19. The method of claim 17, wherein the at least one of the amount of delay or the amount of Doppler shift is based at least in part on one or more of a channel delay, a Doppler spread, a number of transmit antennas, or a number of symbols allocated for a demodulation reference signal (DMRS).

20. The method of claim 17, further comprising receiving, from a user equipment (UE), the delay-Doppler domain information symbols on an uplink channel.

21. The method of claim 20, wherein applying the at least one of the delay or the amount of Doppler shift is a result of receiving, from the UE, the delay-Doppler domain information symbols on the uplink channel.

22. The method of claim 17, further comprising transmitting, via downlink control information (DCI), an indication of the at least one of the amount of delay or the amount of Doppler shift.

23. A method of wireless communication performed by an apparatus of a user equipment (UE), comprising:
receiving an indication of at least one of an amount of delay or an amount of Doppler shift, in a delay-Doppler domain, of a signal transmission; and
receiving, in a time-frequency domain, a first signal from a first antenna and a second signal from a second antenna, wherein the second signal is shifted in the delay-Doppler domain, relative to the first signal, by the at least one of the amount of delay or the amount of Doppler shift and
transmitting delay-Doppler domain information symbols on an uplink channel;
wherein receiving the indication of the at least one of the amount of delay or the amount of Doppler shift is a result of transmitting the delay-Doppler domain information symbols on the uplink channel;
wherein the at least one of the amount of delay or the amount of Doppler shift is based at least in part on a number of symbols allocated for a demodulation reference signal (DMRS).

* * * * *